United States Patent

Kaufmann

[15] 3,636,712

[45] Jan. 25, 1972

[54] LIQUID ROCKET ENGINE AND METHOD OF OPERATING SAME

[72] Inventor: Michael Kaufmann, Neubiberg, Germany

[73] Assignee: Bolkaw Gesellschaft mit beschankter Haftung, Hamburg, Germany

[22] Filed: Dec. 21, 1964

[21] Appl. No.: 422,067

[30] Foreign Application Priority Data

Dec. 21, 1963 Germany..............................B 74767

[52] U.S. Cl..................................................60/260, 60/261
[51] Int. Cl........................................................F02k 9/02
[58] Field of Search....................................60/35.6, 260, 261

[56] References Cited

UNITED STATES PATENTS

| | | | |
|---|---|---|---|
| 2,585,626 | 2/1952 | Chilton.....................................60/260 |
| 2,816,417 | 12/1957 | Bloomberg..........................60/39.27 |
| 3,036,428 | 5/1962 | Chillson...................................60/260 |

FOREIGN PATENTS OR APPLICATIONS

702,779 1/1954 Great Britain..........................60/260

*Primary Examiner*—Samuel Feinberg
*Attorney*—John J. McGlew and Alfred E. Page

EXEMPLARY CLAIM

1. In a liquid propellant rocket engine including ante-combustion chamber means, main combustion chamber means, means for supplying fuel and oxidizer to the ante-combustion chamber means for combustion therein, means for delivering the combustion gases from the ante-combustion chamber means to the main combustion chamber means, turbine means interposed in the path of the combustion gases being driven thereby, and feed pump means driven by the turbine means: the improvement comprising, in combination, at least one first ante-combustion chamber positioned in advance of said main combustion chamber means; at least one second ante-combustion chamber positioned in advance of said main combustion chamber means; means for supplying fuel and an excess of oxidizer to each first ante-combustion chamber for combustion therein under excess oxidizer condition; means for supplying oxidizer and an excess of fuel to each second ante-combustion chamber for combustion therein under excess fuel conditions; and means for delivering the combustion gases from said first ante-combustion chambers to said main combustion chamber means separately from delivery of the combustion gases from said second ante-combustion chambers to said main combustion chamber means.

23 Claims, 4 Drawing Figures

LIQUID ROCKET ENGINE AND METHOD OF OPERATING SAME

This invention relates to liquid propellant rocket engines and, more particularly, to novel liquid propellant rocket engine of the type including ante-combustion chamber means and main combustion chamber means wherein the propellant mixture preburned in the ante-combustion chamber means is supplied to the main combustion chamber means after power delivery to turbines driving feed pumps; and to a novel method of operating such liquid propellant rocket engines.

Liquid fuel rocket engines of the type to which the present invention is directed are known. In such known engines a portion of the supply of fuel and oxidizer is used to form a mixture having a considerable excess of fuel which is burned in the ante-combustion chamber, and the fuel-rich combustion gases drive two turbines. One of these turbines drives the oxidizer feed pump, while the other turbine drives the fuel feed pump. From the turbines the fuel-rich combustion gases flow into the main combustion chamber wherein they mix with the remaining portion of the fuel and oxidizer supply which has been supplied directly to the main combustion chamber. The combustion gases emanating from the ante-combustion chamber thus burn, together with such remaining portion of the supply, in the main combustion chamber.

However, high-output engines of this type are characterized by avoidable feed losses. In view of the high power required for driving the feed pumps, the turbines driving the feed pumps have to work with a correspondingly high-pressure drop thereacross, and this pressure drop may be of the order of the pressure in the main combustion chamber. The avoidable feed losses result from the condition that those portions of the fuel mixture components which are supplied directly to the main combustion chambers have, relative to the pressure in the main combustion chamber, an excess pressure of the order of the above-mentioned pressure drop across the feed pump driving turbines.

The reason for this feed loss is that the portion of the combustible mixture or supply which is delivered directly into the main combustion chamber is supplied by the same feed pumps which supply the portion of the combustible mixture or supply which is fed into the ante-combustion chamber. This excess pressure imposes an unnecessarily large load on the feed pumps and this, in turn, results in a decrease in effective output of the engine.

An object of the present invention is to increase the output of liquid fuel rocket engines and to eliminate avoidable feed losses occurring in known constructions.

Another object of the invention is to increase the output of liquid fuel rocket engines and to eliminate those feed losses resulting particularly from high-combustion engine pressures.

A further object of the invention is to provide a novel liquid fuel rocket engine.

Still another object of the invention is to provide a novel method of operating liquid fuel rocket engines of the type including ante-combustion chamber means and main combustion chamber means.

In accordance with the present invention, the ante-combustion chambers arranged in advance of one or more main combustion chambers are divided into two sets, with each including one or more ante-combustion chambers. The ante-combustion chambers of one set will hereinafter be referred to as "first" ante-combustion chambers and those of the other set will hereinafter be referred to as "second" ante-combustion chambers.

In particular accordance with the invention method and apparatus, the precombustion in the first ante-combustion chambers is made to take place under excess oxidizer conditions, and the precombustion in the "second" ante-combustion chamber is made to take place under excess fuel conditions. Furthermore, the combustion gases from the first ante-combustion chamber are delivered to the main combustion chamber or chambers separately from delivery of the combustion gases from the second ante-combustion chambers to the main combustion chamber or chambers.

With this arrangement incomplete and consequently relatively cool combustion occurs in each of the ante-chambers. The energy conversion in each antechamber can be adjusted advantageously by suitably selecting the ratio of the mixture components introduced thereinto and this energy conversion is adjusted in accordance with the temperature which the corresponding turbines can withstand.

The oxidizer-rich combustion gases emanating from the first ante-chambers, and the fuel-rich combustion gases emanating from the second ante-combustion chambers, are mixed only when the respective combustion gases have entered the main combustion chamber. In the main combustion chamber, the gaseous state of the still unburned fuel and oxidizer components favors a formation of the combustible mixture, so that the supply into the main combustion chamber can be greatly simplified. Mechanical processing of liquid is thus rendered unnecessary. The combustion gas mixture formed in the apparatus and in accordance with the method of the invention burns in the main combustion chamber.

Due to the relatively high temperature of the combustion gases flowing into the main combustion chamber, the combustion gas mixture normally will react hypergolically and this has a favorable influence on the stability of combustion and on the combustion effects and efficiency. Since there is no direct feeding of the components of the fuel mixture into the main combustion chamber, except possibly for small amounts required for cooling purposes, the aforementioned excess pressure causing the avoidable feed losses is eliminated.

A further advantageous feature of the invention is that the total amount of fuel flowing through the engine can be used for power generation for operating the feed pumps. Thus, the turbines work with only a small pressure thereacross, so that the pressure in the ante-combustion chambers is only slightly larger than the pressure in the main combustion chamber or chambers. Due to the resultant reduction of the mechanical stresses, the ante-combustion chambers, the feed pumps, and the seals can be constructed in a relatively simple manner. Furthermore, the arrangement of the present invention provides for higher operational safety and reliability.

This is true whether or not a single main combustion chamber is provided downstream of the ante-combustion chambers, or whether several main combustion chambers are provided downstream of the ante-combustion chambers. In one embodiment of the invention, a turbine in driving connection with a feed pump is positioned at the discharge of each of the ante-combustion chambers. Thus, and provided that a suitable size of feed pump is selected, the latter can be driven without the interposition of reduction gearing. This embodiment of the invention is particularly suitable for engines wherein fuel mixture components of different densities are employed.

However, if the fuel mixture components have substantially the same density, another embodiment of the invention may be used in which a single common turbine is positioned in operative relation with the discharges of both ante-combustion chambers. In such case the single turbine is separately charged by the combustion gases emanating from the respective sets of ante-combustion chambers. The turbine can advantageously be used to drive all of the required feed pumps. The separate charging of the turbine is necessary in order to avoid premature mixing of the respective combustion gases from the two sets of ante-combustion chambers which, due to hypergolical reaction, would cause combustion to take place within the turbines.

In accordance with a feature of the invention an engine of relatively small dimensions relative to its output may be provided by arranging the ante-chambers in coaxial relation with each other. Furthermore, the feed pumps can be driven through coaxial shafts.

In accordance with a further feature of the invention, however, the ante-combustion chambers can be arranged in a laterally adjacent relation. Also, the feed pumps can be driven by shafts which extend in laterally adjacent relation, and such construction results in excellent accessibility and also in a simple construction of the individual components.

According to a still further feature of the invention, and to facilitate a good mixture of the combustion gases, the combustion gases emanating from the respective sets of ante-combustion chambers are supplied to the main combustion chamber or chambers in a coaxial manner.

For an understanding of the principles of the invention, reference is made to the following description of typical embodiments thereof as illustrated in the accompanying drawings:

Figure 1:
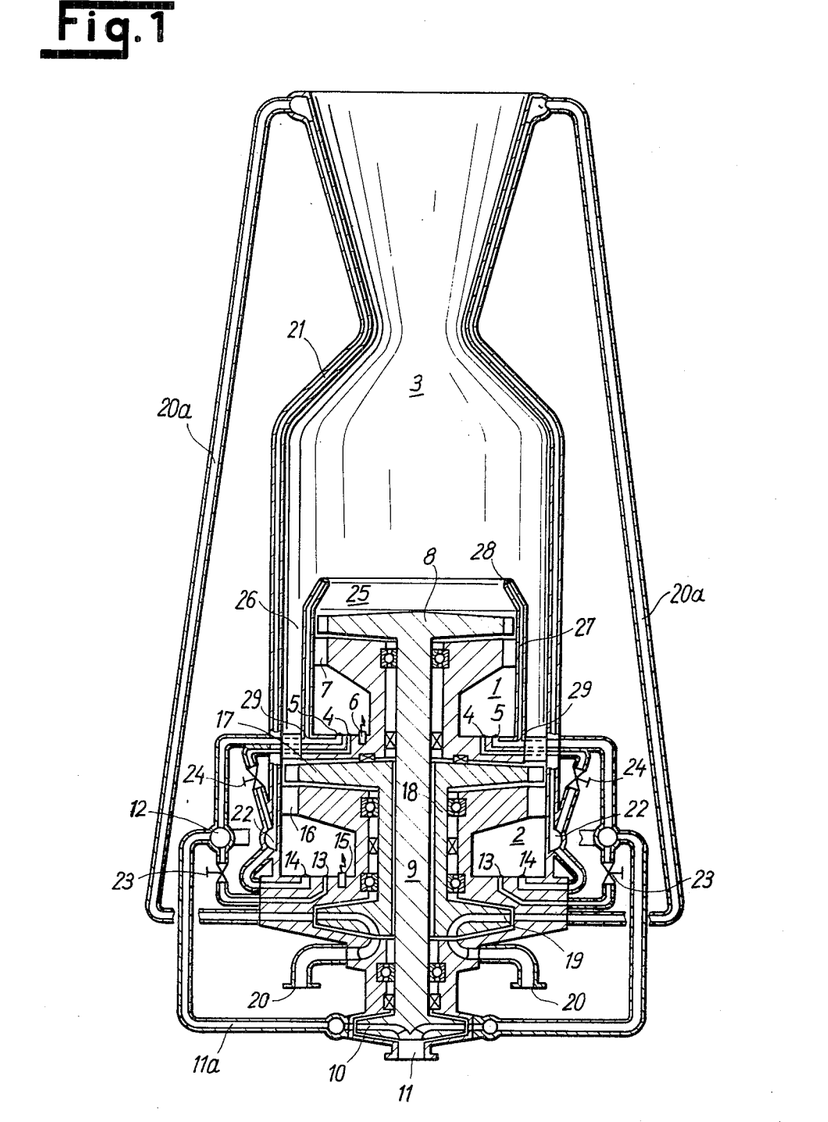
FIG. 1 is a longitudinal sectional view through one form of liquid fuel rocket engine embodying the invention and having two coaxial shafts for driving the feed pumps.

Referring to FIG. 1, the liquid fuel rocket engine therein illustrated includes a first ante-combustion chamber 1 which is charged or supplied with fuel through lines 4 and is charged or supplied with oxidizer through lines 5, the chamber 1 being charged with an excess of oxidizer. The resulting mixture, in the event it does not react hypergolically, is ignited by an ignition device 6. The oxidizer-rich combustion gases flow through the stationary turbine guide vanes 7 and the vanes of a turbine rotor 8 which, through a shaft 9, drives a feed pump 10 which withdraws oxidizer from a supply container (not shown) through an inlet pipe 11. Through lines 11a pump 10 delivers the oxidizer into ante-combustion chamber 1 and into a second ante-combustion chamber 2 through distributors 12 and oxidizer feed lines 5 and 13, respectively.

The ante-combustion chamber 2 is positioned axially outwardly of the ante-combustion chamber 1, and is charged with an excess of fuel through fuel lines 14. As in the case of ante-combustion chamber 1, if the mixture formed in ante-combustion chamber 2 does not react hypergolically, it is ignited by an ignition device 15. The fuel-rich combustion gases flow through stationary turbine guide vanes 16 and through the vanes of a turbine rotor 17. Through a hollow shaft 18 turbine 17 drives a fuel feed pump 19, hollow shaft 18 being mounted coaxially with shaft 9. Feed pump 19 withdraws fuel from a supply container (not shown) through an inlet pipe 20, and supplies the fuel to the cooling system 21 of the main combustion chamber 3 through lines 20a. Fuel from the cooling system 21 flows through a distributor 22 to the fuel lines 4 and 14 and thus to the ante-combustion chambers 1 and 2, respectively. For the purposes of adjusting or setting the mixture required for the respective ante-combustion chambers, control means 23 are provided for metering and adjusting the oxidizer supply to the ante-combustion chamber 2 and control or regulating means 24 are provided for regulating the fuel supply to the ante-combustion chamber 1.

The combustion gases from the respective ante-chambers flow through separate coaxial passes 25 and 26 into main combustion chamber 3, where they burn in hypergolically reacting manner. An annular pipe or conduit 27 forms the outer wall of passage 25 and the inner wall of passage 26. Pipe 27, at its end 28 facing downstream of the flow, is subjected to high temperatures due to the combustion occurring in this area. For this purpose, cooling means for pipe 27 are provided.

Cooling of the pipe 27 is effected, as illustrated, by passing a small portion of a propellant mixture component through annular pipe 27, and this small portion of the component is discharged at pipe end 28 into main combustion chamber 3. The cooling agent may be, for example, the oxidizer. In such case taps 29 are provided to divert oxidizer from oxidizer lines 5 into annular pipe 27. However, this variation from the underlying principles of the invention is insignificant since, for the purpose of cooling pipe 27, only very small amounts of oxidizer are required.

However, it is also possible to provide for cooling of pipe 27 without directing a fuel mixture component into main combustion chamber 3. For such purpose that component of the combustible mixture which is not used for cooling the main combustion chamber 3, that is, in the present instance the oxidizer, is completely or partially supplied to the end of pipe 27 through a pipe system arranged in the wall of pipe 27 and flows, without entering into main combustion chamber 3, through a recycling system also provided in wall of pipe 27, and from there to one or both of the ante-chambers As an embodiment of this type can be easily visualized, it has not been specifically illustrated.

The liquid fuel rocket engine illustrated in FIG. 1 is particularly usable with combustible mixture components of different densities since the feed pumps 10 and 19 can be driven at different respective speeds.

Figure 2:
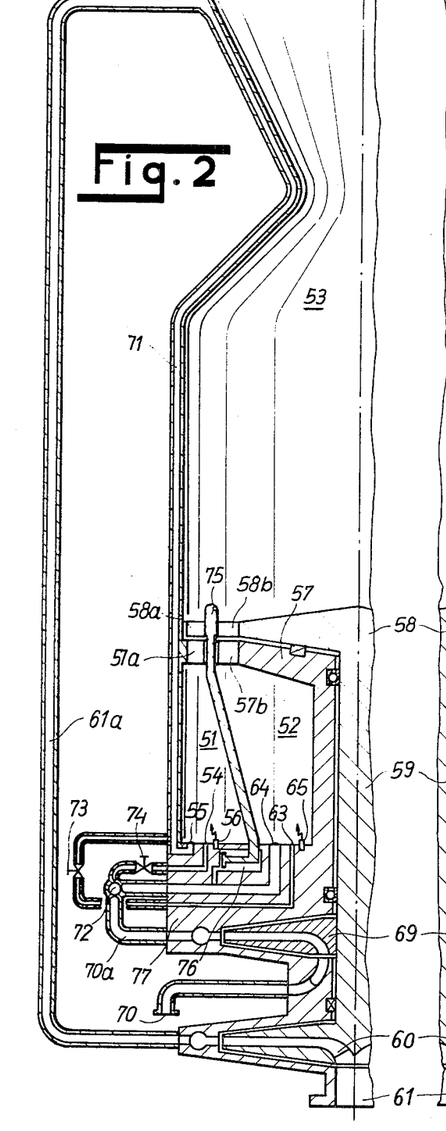
FIG. 2 is a longitudinal sectional view through another form of liquid fuel rocket engine embodying the invention and having two coaxial ante-combustion chambers and a single driving shaft for the feed pumps.
Figure 3:
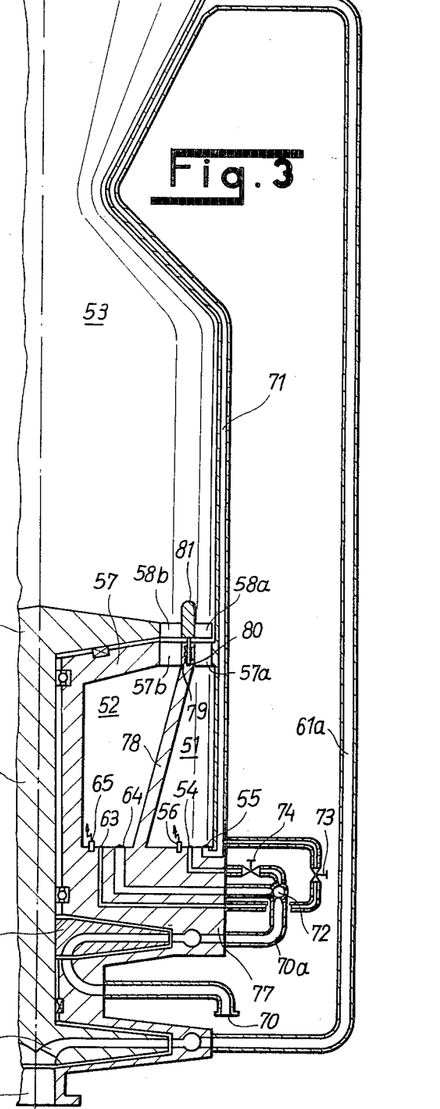
FIG. 3 is a longitudinal sectional view through a modification of the liquid fuel rocket engine shown in FIG. 2.

The liquid fuel rocket engines illustrated in FIGS. 2 and 3 differ from each other only in respect to the construction of the respective separating walls 75 and 80–81. Thus, except for these separating walls, the same description will apply to both embodiments, and corresponding or identical parts have been indicated with the same reference characters. In each Figure the engine includes a first ante-combustion chamber 51, a second ante-combustion chamber 52, and a main combustion chamber 53. Ante-combustion chambers 51 and 52 are coaxial with each other and substantially axially coextensive with each other. Fuel is supplied to ante-combustion chamber 51 through fuel lines 54, and oxidizer is supplied thereto through oxidizer lines 55. Chamber 51 is provided with an ignition device 56, which, however, is not necessary if the components of the combustible mixture react with each other hypergolically.

Similarly, oxidizer is supplied to antechamber 52 through oxidizer lines 63, fuel is supplied thereto through a fuel line 64, and, if necessary, an ignition device 65 is provided to ignite the combustible mixture in the event that it does not ignite in a hypergolic manner.

The oxidizer-rich combustion gases from ante-combustion chamber 51 flow through outer turbine guiding vanes 57a of a stationary guide device 57 and through outer vanes 58a of a turbine rotor 58 and thus into main combustion chamber 53. The fuel-rich combustion gases of chamber 52 pass through the inner turbine vanes 57b of guide device 57 and through the inner vanes 58b of turbine rotor 58 into main combustion chamber 53. Thus the two combustion gas portions are mixed only after they enter main combustion chamber 53 and burn therein while reacting hypergolically.

Through a shaft 59, turbine rotor 58 drives feed pumps 60 and 69. Feed pump 60 withdraws oxidizer through an inlet pipe 61 from a supply container (not shown) and delivers the oxidizer through lines 61a to the cooling system 71 of the main combustion chamber 53. After cooling the main combustion chamber 53, the oxidizer flows through oxidizer lines 55 and 63 into the ante-combustion chambers 51 and 52, respectively. In a similar manner, feed pump 69 withdraws fuel through inlet pipes 70 from a supply container (not shown), and delivers the fuel under pressure to lines 70a, distributors 72, and fuel lines 54 and 64 into the respective ante-combustion chambers 51 and 52. As in the embodiment of FIG. 1, control means 73 and 74 are provided to adjust the ratio of the combustible mixture, or other necessary conditions in the ante-chambers.

In both embodiments of the engine, as shown in FIGS. 2 and 3, a separating wall is provided to prevent intermixing of the combustion gases emanating from the respective ante-chambers before these combustion gases enter main combustion chamber 53. In the embodiment of FIG. 2, separating wall 75 is fixed to rotate with turbine rotor 58. Separating wall 75 extends between the outer turbine vane ring 58a and the inner turbine vane ring 58b, wall 75 being preferably rotationally symmetrical. Wall 75 extends through guiding means 57 without engagement thereof and thus separates the outer vanes 57a of the guide device from the inner vanes 57b, thereof.

In addition partition means or separating wall 75 forms the inner surface of chamber 51 and the outer surface of chamber 52. A liquid seal 76 which may, for example, be charged with fuel forms the joint between the stationary engine casing 77 and partition means 75 rotating with turbine rotor 58. Fuel which may leak from seal 76 into the ante-combustion chambers may be taken into consideration in adjusting the mixing conditions by regulating the fuel supply to the ante-combustion chambers through the fuel lines 54 and 64, respectively.

In the embodiment of the invention shown in FIG. 3, separating wall or partition means 78 is fixed or integral with engine casing 77 and with guide means 57. Wall 78 forms the inner boundary of chamber 51 and the outer boundary of chamber 52, and also separates the outer stationary guide vanes 57a from the inner stationary guide vanes 57b. Wall 78 terminates, downstream of the flow direction, at guide means 57. At this end the wall has formed, in its end surface, an annular slot 79 in which there is engaged an annular rib or fin 80. Slot 79 and rib or fin 80 are arranged to form a labyrinth seal. Rib or fin 80 is connected or integral with ring 81 which separates outer turbine rotor vane ring 58a from inner turbine rotor vane ring 58b. Ring 81 is, in turn, a component or an integral part of turbine rotor 58.

The embodiments of a liquid fuel rocket engine in accordance with the invention, as shown in FIGS. 2 and 3, are particularly suitable for use with fuel mixture components having substantially similar specific gravities or densities since the feed pumps 60 and 69 rotate at the same speed.

Figure 4:
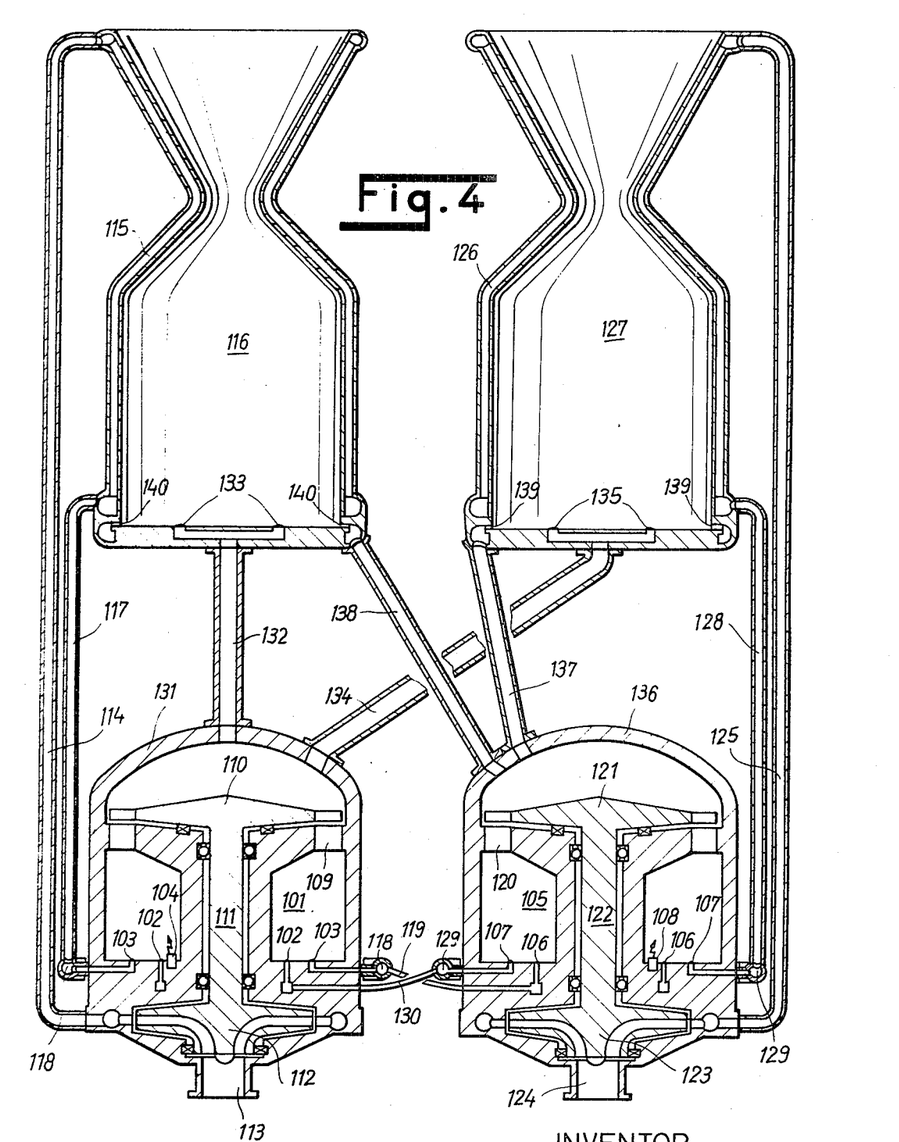
FIG. 4 is a longitudinal sectional view through another form of liquid fuel rocket engine embodying the invention, and including a pair of ante-combustion chambers arranged in laterally spaced relation and a pair of pump driving shafts arranged in laterally spaced relation.

The embodiment of the liquid fuel rocket engine shown in FIG. 4 includes laterally spaced parallel pump driving shafts and laterally spaced and positioned ante-combustion chambers, and further includes a pair of combustion chambers arranged downstream from the ante-combustion chambers. Fuel lines 102 and oxidizer lines 103 supply fuel and oxidizer, respectively, to a first ante-combustion chamber 101. This chamber includes an ignition device 104, which can be omitted if the fuel mixture components react hypergolically. Oxidizer lines 106 and fuel lines 107 provide oxidizer and fuel, respectively, to a second ante-combustion chamber 105 which also may be provided with ignition device 108 which can be omitted if the fuel mixture components react hypergolically.

The oxidizer-rich combustion gases emanating from chamber 101 pass through the stationary vanes of a guide device 109 and through the vanes of a turbine rotor 110 which, through the shaft 111, drives a feed pump 112. Pump 112 draws the oxidizer, such as liquid oxygen, from a supply container (not shown) through an inlet pipe 113, and this discharges the oxidizer through line 114 to a cooling system 115 of a first main combustion chamber 116. After cooling the main combustion chamber 116, the oxidizer flows through the line 117 into a distributor 118. Oxidizer supply lines 103 are connected to distributor 118 and the larger portion of the oxidizer flow through oxidizer supply lines 103 to ante-combustion chamber 101. By contrast, a smaller proportion of the oxidizer is supplied to the second ante-combustion chamber 105 through an intermediate line 119, connected to distributor 118, and through oxidizer supply lines 106.

The fuel-rich combustion gases in chamber 105 flow through the stationary vanes of a guide device 120 and through the vanes of a turbine rotor 121 driving a second feed pump 123 through the medium of a shaft 122. Pump 123 withdraws the fuel, such as liquid hydrogen, from a supply container (not shown) through an inlet pipe 124, and discharges the fuel through line 125 to the cooling system 126 of the second main combustion chamber 127. After cooling combustion chamber 127, the fuel flows through lines 128 to a distributor 129. Fuel supply lines 107 are connected to distributor 129 to direct the larger portion of the fuel into chamber 105. By contrast, a smaller portion of the fuel is directed to chamber 101 through an intermediate line 130, connected to distributor 129, and through fuel supply lines 102.

After driving turbine rotor 110, a portion of the oxidizer-rich combustion gases emanating from chamber 101 flows through a first combustion gasline 132 and discharge openings or ports 133 into combustion chamber 116. This line 132 connects casing 131 with combustion chamber 116. The other portion of the oxidizer-rich combustion gases flows through a second combustion gasline 134, interconnecting casing 131 and combustion chamber 127, into main combustion chamber 127 through ports 135. In a similar manner fuel-rich combustion gases emanating from chamber 105 flow through combustion gaslines 137 and 138, respectively, and annular gaps or ports 139 and 140, respectively, into the main combustion chambers 127 and 116, respectively. Thus, combustion gaslines 137 and 138 connect casing 136 with main combustion chambers 127 and 116, respectively. The combustion gases from the two ante-combustion chamber 101 and 105 mix only in the main combustion chambers, and burn hypergolically therein. Both of these main combustion chambers preferably are supplied with substantially equal amounts of combustion gases so that the energy outputs of both main combustion chambers are substantially equal.

Of course, each of the laterally spaced ante-combustion chambers can be combined with either one or more than two main combustion chambers, in the same manner as the ante-combustion chambers of the engines shown in FIGS. 1, 2 and 3 can be arranged upstream of several main combustion chambers. In all embodiments, both components of the combustible mixture can be used for cooling the main combustion chambers, as shown in FIG. 4, provided these components are suitable for use as coolants. On the other hand, the two main combustion chambers of FIG. 4 may be cooled by only one component of the combustible mixture if there is a low-energy output, and this one component is then supplied to the cooling systems in parallel circuits.

In such case, the second component of the combustible mixture would then be supplied directly to the ante-combustion chambers in a manner such as shown in the engines of FIGS 1, 2 and 3.

While specific embodiments of the invention have been shown and described in detail to illustrate the application of the principles of the invention, it will be understood that the invention may be embodied otherwise without departing from such principles.

What is claimed is:

1. In liquid propellant rocket engine including ante-combustion chamber means, main combustion chamber means, means for supplying fuel and oxidizer to the ante-combustion chamber means for combustion therein, means for delivering the combustion gases from the ante-combustion chamber means to the main combustion chamber means, turbine means interposed in the path of the combustion gases being driven thereby, and feed pump means driven by the turbine means: the improvement comprising, in combination, at least one first ante-combustion chamber positioned in advance of said main combustion chamber means; at least one second ante-combustion chamber positioned in advance of said main combustion chamber means; means for supplying fuel and an excess of oxidizer to each first ante-combustion chamber for combustion therein under excess oxidizer conditions; means for supplying oxidizer and an excess of fuel to each second ante-combustion chamber for combustion therein under excess fuel conditions; and means for delivering the combustion gases from said first ante-combustion chambers to said main combustion chamber means separately from delivery of the combustion gases from said second ante-combustion chambers to said main combustion chamber means.

2. In a liquid fuel rocket engine including ante-combustion chamber means, main combustion chamber means, means for supplying fuel and oxidizer to the ante-combustion chamber means for combustion therein, means for delivering the combustion gases from the ante-combustion chamber means to the main combustion chamber means, turbine means interposed in the path of the combustion gases for driving thereby, and feed pump means driven by the turbine means; the improvement comprising, in combination, at least one first ante-combustion chamber positioned in advance of said main combustion chamber means; at least one second ante-combustion chamber positioned in advance of said main combustion chamber means; means for supplying fuel and an excess of oxidizer to each first ante-combustion chamber for combustion therein under excess oxidizer conditions; means for supplying oxidizer and an excess of fuel to each second ante-combustion chamber for combustion therein under excess fuel conditions; first delivery means for delivering the combustion gases from said first ante-combustion chamber to said main combustion chamber means; and second delivery means, separate from said first delivery means, for delivering the combustion gases from said second ante-combustion chambers to said min combustion chamber means.

3. In a liquid fuel rocket engine including ante-combustion chamber means, main combustion chamber means, means for supplying fuel and oxidizer to the ante-combustion chamber means for combustion therein, means for delivering the combustion gases from the ante-combustion chamber means to the main combustion chamber means, turbine means interposed in the path of the combustion gases for driving thereby, and feed pump means driven by the turbine means: the improvement comprising, in combination, at least one first ante-combustion chamber positioned in advance of said main combustion chamber means; at least one second ante-combustion chamber positioned in advance of said main combustion chamber means; means for supplying fuel and an excess of oxidizer to each first ante-combustion chamber for combustion therein under excess oxidizer conditions; means for supplying oxidizer and an excess of fuel to each second ante-combustion chamber for combustion therein under excess fuel conditions; and means for delivering the combustion gases from said first ante-combustion chambers to said main combustion chamber means separately from delivery of the combustion gases from said second ante-combustion chambers to said main combustion chamber means; said first and second ante-combustion chambers constituting the sole sources of combustible mixture delivered to said main combustion chamber means.

4. In a liquid fuel rocket engine including ante-combustion chamber means, main combustion chamber means, means for supplying fuel and oxidizer to the ante-combustion chamber means for combustion therein, means for delivering the combustion gases from the ante-combustion chamber means to the main combustion chamber means, turbine means interposed in the path of the combustion gases for driving thereby, and feed pump means driven by the turbine means: the improvement comprising, in combination, at least one first ante-combustion chamber positioned in advance of said main combustion chamber means; at least one second ante-combustion positioned in advance of said main combustion chamber means; means for supplying fuel and an excess of oxidizer to each first ante-combustion chamber for combustion therein under excess oxidizer conditions; means for supplying oxidizer and an excess of fuel to each second ante-combustion chamber for combustion therein under excess fuel conditions; and means for delivering the combustion gases from said first ante-combustion chambers to said main combustion chamber means separately from delivery of the combustion gases from said second ante-combustion chambers to said main combustion chamber means; said turbine means comprising turbines equal in number to said ante-combustion chambers and each operatively associated with a respective ante-combustion chamber.

5. In a liquid fuel rocket engine including ante-combustion chamber means, main combustion chamber means, means for supplying fuel and oxidizer to the ante-combustion chamber means for combustion therein, means for delivering the combustion gases from the ante-combustion chamber means to the main combustion chamber means, turbine means interposed in the path of the combustion gases for driving thereby, and feed pump means driven by the turbine means: the improvement comprising, in combination, at least one first ante-combustion chamber positioned in advance of said main combustion chamber means; at least one second ante-combustion chamber positioned in advance of said main combustion chamber means; means for supplying fuel and an excess of oxidizer to each first ante-combustion chamber for combustion therein under excess oxidizer conditions; means for supplying oxidizer and an excess of fuel to each second ante-combustion chamber for combustion therein under excess fuel conditions; means for delivering the combustion gases from said first ante-combustion chambers to said main combustion chamber means separately from delivery of the combustion gases from said second ante-combustion chambers to said main combustion chamber means; said turbine means comprising turbines equal in number to said ante-combustion chambers and each operatively associated with the respective ante-combustion chamber; and feed pumps constituting said feed pump means and equal in number to said turbines and each driven by a respective turbine.

6. In a liquid fuel rocket engine including ante-combustion chamber means, main combustion chamber means, means for supplying fuel and oxidizer to the ante-combustion chamber means for combustion therein, means for delivering the combustion gases from the ante-combustion chamber means to the main combustion chamber means, turbine means interposed in the path of the combustion gases for driving thereby, and feed pump means driven by the turbine means: the improvement comprising, in combination, at least one first ante-combustion chamber positioned in advance of said main combustion chamber means; at least one second ante-combustion chamber positioned in advance of said main combustion chamber means; means for supplying fuel and an excess of oxidizer to each first ante-combustion chamber for combustion therein under excess oxidizer conditions; means for supplying oxidizer and an excess of fuel to each second ante-combustion chamber for combustion therein under excess fuel conditions; and means for delivering the combustion gases from said first ante-combustion chambers to said main combustion chamber means separately from delivery of the combustion gases from said second ante-combustion chambers to said main combustion chamber means; said turbine means comprising a turbine commonly operatively associated with both said first and said second ante-combustion chambers; the combustion gases from said first and second ante-combustion chambers flowing in separate paths through said common turbine to said main combustion chamber means.

7. In a liquid fuel rocket engine including ante-combustion chamber means, main combustion chamber means, means for supplying fuel and oxidizer to the ante-combustion chamber means for combustion therein, means for delivering the combustion gases from the ante-combustion chamber means to the main combustion chamber means, turbine means interposed in the path of the combustion gases for driving thereby, and feed pump means driven by the turbine means: the improvement comprising, in combination, at least one first ante-combustion chamber positioned in advance of said main combustion chamber means; at least one second ante-combustion chamber positioned in advance of said main combustion chamber means; means for supplying fuel and an excess of oxidizer to each first ante-combustion chamber for combustion therein under excess oxidizer conditions; means for supplying oxidizer and an excess of fuel to each second ante-combustion chamber for combustion therein under excess fuel conditions; and means for delivering the combustion gases from said first ante-combustion chambers to said main combustion chamber means separately from delivery of the combustion gases from said second ante-combustion chambers to said main combustion chamber means; said turbine means comprising a turbine commonly operatively associated with both said first and said second ante-combustion chambers; the combustion gases from said first and second ante-combustion chambers flowing in separate paths through said common turbine to said main combustion chamber means; said feed pump means comprising plural feed pumps commonly driven by said common turbine.

8. In a liquid fuel rocket engine including ante-combustion chamber means, main combustion chamber means, means for supplying fuel and oxidizer to the ante-combustion chamber means for combustion therein, means for delivering the combustion gases from the ante-combustion chamber means to the main combustion chamber means to the main combustion chamber means, turbine means interposed in the path of the combustion gases for driving thereby, and feed pump means driven by the turbine means: the improvement comprising, in combination, at least one first ante-combustion chamber positioned in advance of said main combustion chamber means; at least one second ante-combustion chamber positioned in advance of said main combustion chamber means; means for supplying fuel and an excess of oxidizer to each first ante-combustion chamber for combustion therein under excess oxidizer conditions; means for supplying oxidizer and an excess of fuel to each second ante-combustion chamber for combustion therein under excess fuel conditions; and means for delivering the combustion gases from said first ante-combustion chambers to said main combustion chamber means separately from delivery of the combustion gases from said second ante-combustion chambers to said main combustion chamber means; said ante-combination chambers being arranged coaxially of each other.

9. In a liquid fuel rocket engine including ante-combustion chamber means, main combustion chamber means, means for supplying fuel and oxidizer to the ante-combustion chamber means for combustion therein, means for delivering the combustion gases from the ante-combustion chamber means to the main combustion chamber means, turbine means interposed in the path of the combustion gases for driving thereby, and feed pump means driven by the turbine means: the improvement comprising, in combination, at least one first ante-combustion chamber positioned in advance of said main combustion chamber means; at least one second ante-combustion chamber positioned in advance of said main combustion chamber means; means for supplying fuel and an excess of oxidizer to each first ante-combustion chamber for combustion therein under excess oxidizer conditions; means for supplying oxidizer and an excess of fuel to each second ante-combustion chamber for combustion therein under excess fuel conditions; and means for delivering the combustion gases from said first ante-combustion chambers to said main combustion chamber means separately from delivery of the combustion gases from said second ante-combustion chambers to said main combustion chamber means; said ante-combustion chambers being arranged in pairs, each including a first ante-combustion chamber and a second ante-combustion chamber in coaxial relation; one ante-combustion chamber of each pair being arranged in circumferentially embracing relation with the other ante-combustion chamber of each pair.

10. In a liquid fuel rocket engine including ante-combustion chamber means, main combustion chamber means, means for supplying fuel and oxidizer to the ante-combustion chamber means for combustion therein, means for delivering the combustion gases from the ante-combustion chamber means to the main combustion chamber means, turbine means interposed in the path of the combustion gases for driving thereby, and feed pump means driven by the turbine means: the improvement comprising in combination, at least one first ante-combustion chamber positioned in advance of said main combustion chamber means; at least one second ante-combustion chamber positioned in advance of said main combustion chamber means; means for supplying fuel and an excess of oxidizer conditions; means for supplying oxidizer and an excess of fuel to each second ante-combustion chamber for combustion therein under excess fuel conditions; and means for delivering the combustion gases from said first ante-combustion chamber to said main combustion chamber means separately from delivery of the combustion gases from said second ante-combustion chambers to said main combustion chamber means; said ante-combustion chambers being arranged in coaxial relation with each other; said main combustion chambers means comprising at least one main combustion chamber arranged in coaxial relation with said ante-combustion chambers.

11. In a liquid fuel rocket engine including ante-combustion chamber means, main combustion chamber means, means for supplying fuel and oxidizer to the ante-combustion chamber means for combustion therein, means for delivering the combustion gases from the ante-combustion chamber means to the main combustion chamber means, turbine means interposed in the path of the combustion gases for driving thereby, and feed pump means driven by the turbine means: the improvement comprising, in combination, at least one first ante-combustion chamber positioned in advance of said main combustion chamber means; at least one second ante-combustion chamber positioned in advance of said main combustion chamber means; means for supplying fuel and an excess of oxidizer to each first ante-combustion chamber for combustion therein under excess oxidizer conditions; means for supplying oxidizer and an excess of fuel to each second ante-combustion chamber for combustion therein under excess fuel conditions; and means for delivering the combustion gases from said first ante-combustion chambers to said min combustion chamber means separately from delivery of the combustion gases from said second ante-combustion chambers to said main combustion chamber means; said ante-combustion chambers being arranged in pairs, each including a first ante-combustion chamber and a second ante-combustion chamber in coaxial relation; one ante-combustion chamber of each pair being arranged in circumferentially embracing relation with the other ante-combustion chamber of each pair; said main combustion chamber means comprising at least one main combustion chamber arranged coaxially with said ante-combustion chambers.

12. In a liquid fuel rocket engine including ante-combustion chamber means, main combustion chamber means, means for supplying fuel and oxidizer to the ante-combustion chamber means for combustion therein, means for delivering the combustion gases from the ante-combustion chamber means to the main combustion chamber means, turbine means interposed in the path of the combustion gases for driving thereby, and feed pump means driven by the turbine means: the improvement comprising, in combination, at least one first ante-combustion chamber positioned in advance of said main combustion chamber means; at least one second ante-combustion chamber positioned in advance of said main combustion chamber means; means for supplying fuel and an excess of oxidizer to each first ante-combustion chamber for combustion therein under excess oxidizer conditions; means for supplying oxidizer and an excess of fuel to each second ante-combustion chamber for combustion therein under excess fuel conditions; and means for delivering the combustion gases from said first ante-combustion chambers to said main combustion chamber means separately from delivery of the combustion gases from said second ante-combustion chambers to said main combustion chamber means; said first and second ante-combustion chambers being arranged in laterally adjacent pairs each comprising a first ante-combustion chamber and a second ante-combustion chamber.

13. In a liquid fuel rocket engine including ante-combustion chamber means, main combustion chamber means, means for supplying fuel and oxidizer to the ante-combustion chamber means for combustion therein, means for delivering the combustion gases from the ante-combustion chamber means to the main combustion chamber means, turbine means interposed in the path of the combustion gases for driving thereby, and feed pump means driven by the turbine means: the improvement comprising, in combination, at least one first ante-combustion chamber positioned in advance of said main combustion chamber means; at least one second ante-combustion chamber positioned in advance of said main combustion chamber means; means for supplying fuel and an excess of oxidizer to each first ante-combustion chamber for combustion therein under excess oxidizer conditions; means for supplying oxidizer and an excess of fuel to each second ante-combustion chamber for combustion therein under excess fuel conditions; and means for delivering the combustion gases from said first ante-combustion chambers to said main combustion chamber means separately from delivery of the combustion gases from said second ante-combustion chambers to said main combustion chamber means; said first and second ante-combustion chambers being arranged in laterally adjacent and laterally spaced pairs each comprising a first ante-combustion chamber and a second ante-combustion chamber.

14. In a liquid fuel rocket engine including ante-combustion chamber means, main combustion chamber means, means for supplying fuel and oxidizer to the ante-combustion chamber means for combustion therein, means for delivering the combustion gases from the ante-combustion chamber means to the main combustion chamber means, turbine means interposed in the path of the combustion gases for driving thereby, and feed pump means driven by the turbine means: the improvement comprising, in combination, at least one first ante-combustion chamber positioned in advance of said main combustion chamber means; at least one second ante-combustion chamber positioned in advance of said main combustion chamber means; means for supplying fuel and an excess of oxidizer to each first ante-combustion chamber for combustion therein under excess oxidizer conditions; means for supplying oxidizer and an excess of fuel to each second ante-combustion chamber for combustion therein under excess fuel conditions; and means for delivering the combustion gases from said first ante-combustion chambers to said main combustion chamber means separately from delivery of the combustion gases from said second ante-combustion chamber to said main combustion chamber means; said ante-combustion chambers being arranged in coaxial relation with each other; said turbine means comprising a number of turbines equal to the number of ante-combustion chambers and each operatively associated with a respective ante-combustion chamber; said feed pump means comprising feed pumps equal in number to said turbines and each driven by a respective turbine through a respective drive shaft; said drive shafts being coaxially arranged.

15. In a liquid fuel rocket engine including ante-combustion chamber means, main combustion chamber means, means for supplying fuel and oxidizer to the ante-combustion chamber means for combustion therein, means for delivering the combustion gases from the ante-combustion chamber means to the main combustion chamber means, turbine means interposed in the path of the combustion gases for driving thereby, and feed pump means driven by the turbine means: the improvement comprising, in combination, at least one first ante-combustion chamber positioned in advance of said main combustion chamber means; at least one second ante-combustion chamber positioned in advance of said main combustion chamber means; means for supplying fuel and an excess of oxidizer to each first ante-combustion chamber for combustion therein under excess oxidizer conditions; means for supplying oxidizer and an excess of fuel to each second ante-combustion chamber therein under excess fuel conditions; and means for delivering the combustion gases from said first ante-combustion chambers to said main combustion chamber means separately from delivery of the combustion gases from said second ante-combustion chambers to said main combustion chamber means; said turbine means comprising a number of turbines equal to the number of ante-combustion chambers and each operatively associated with a respective ante-combustion chamber; said feed pump means comprising feed pumps equal in number to said turbines and each driven by a respective turbine through a respective drive shaft; said drive shafts being in laterally adjacent relation with each other.

16. In a liquid fuel rocket engine including ante-combustion chamber means, main combustion chamber means, means for supplying fuel and oxidizer to the ante-combustion chamber means for combustion therein, means for delivering the combustion gases from the ante-combustion chamber means to the main combustion chamber means, turbine means interposed in the path of the combustion gases for driving thereby, and feed pump means driven by the turbine means: the improvement comprising, in combination, at least one first ante-combustion chamber positioned in advance of said main combustion chamber means; at least one second ante-combustion chamber positioned in advance of said main combustion chamber means; means for supplying fuel and an excess of oxidizer to each first ante-combustion chamber for combustion therein under excess oxidizer conditions; means for supplying oxidizer and an excess of fuel to each second ante-combustion chamber for combustion therein under excess fuel condition; first delivery means for delivering the combustion gases from said first ante-combustion chamber to said main combustion chamber means; and second delivery means, separate from said first delivery means, for delivering the combustion gases from said second ante-combustion chambers to said main combustion chamber means; said first and second delivery means being arranged coaxially of each other.

17. In a liquid fuel rocket engine including ante-combustion chamber means, main combustion chamber means, means for supplying fuel and oxidizer to the ante-combustion chamber means for combustion therein, means for delivering the combustion gases from the ante-combustion chamber means to the main combustion chamber means, turbine means interposed in the path of the combustion gases for driving thereby, and feed pump means driven by the turbine means: the improvement comprising, in combination, at least one first ante-combustion chamber positioned in advance of said main combustion chamber means; at least one second ante-combustion chamber positioned in advance of said main combustion chamber means; means for supplying fuel and an excess of oxidizer to each first ante-combustion chamber for combustion therein under excess oxidizer conditions; means for supplying oxidizer and an excess of fuel to each second ante-combustion chamber for combustion therein under excess fuel conditions; said main combustion chamber means comprising plural main combustion chambers each having cooling means operatively associated therewith; and means for supplying a combustible mixture component to each of said cooling means.

18. In a liquid fuel rocket engine including ante-combustion chamber means, main combustion chamber means, means for supplying fuel and oxidizer to the ante-combustion chamber means for combustion therein, means for delivering the combustion gases from the ante-combustion chamber means to the main combustion chamber means, turbine means interposed in the path of the combustion gases for driving thereby, and feed pump means driven by the turbine means: the improvement comprising, in combination, at least one first ante-combustion chamber positioned in advance of said main combustion chamber means; at least one second ante-combustion chamber positioned in advance of said main combustion chamber means; means for supplying fuel and an excess of oxidizer to each first ante-combustion chamber for combustion therein under excess oxidizer conditions; means for supplying oxidizer and an excess of fuel to each second ante-combustion chamber for combustion therein under excess fuel conditions; means for delivering the combustion gases from the said first ante-combustion chambers to said main combustion chamber means separately from delivery of the combustion gases from said second ante-combustion chambers to said main combustion chamber means; cooling means operatively associated with said main combustion chamber means; and means for supplying both components of the combustible mixture to said cooling means.

19. In a liquid fuel rocket engine including ante-combustion chamber means, main combustion chamber means, means for supplying fuel and oxidizer to the ante-combustion chamber means for combustion therein, means for delivering the combustion gases from the ante-combustion chamber means to the main combustion chamber means, turbine means interposed in the path of the combustion gases for driving thereby, and feed pump means driven by the turbine means: the improvement comprising, in combination, a first ante-combustion chamber positioned in advance of said main combustion chamber means; a second ante-combustion chamber positioned in advance of said main combustion chamber means; means for supplying fuel and an excess of oxidizer to said first ante-combustion chamber for combustion therein under access oxidizer conditions; means for supplying oxidizer and an excess of fuel to said second ante-combustion chamber for combustion therein under excess fuel conditions; first delivery means for delivering the combustion gases from said first ante-combustion chamber to said main combustion chamber means; second delivery means, separate from said first delivery means, for delivering the combustion gases from said second ante-combustion chambers to said main combustion chamber means; said first and second ante-combustion chambers being arranged coaxially of each other with one of said ante-combustion chambers circumferentially embracing the other ante-combustion chamber; said turbine means comprising a turbine commonly associated with both said first and second ante-combustion chambers and including a stator forming one end wall of both said first and second ante-combustion chambers and a rotor coaxial with said ante-combustion chambers; and an annular partition extending from said common turbine and separating said first and second ante-combustion chambers from each other and further separating said first and second delivery means from each other.

20. In a liquid fuel rocket engine including ante-combustion chamber means, main combustion chamber means, means for supplying fuel and oxidizer to the ante-combustion chamber means for combustion therein, means for delivering the combustion gases from the ante-combustion chamber means to the main combustion chamber means, turbine means interposed in the path of the combustion gases for driving thereby, and feed pump means driven by the turbine means: the improvement comprising, in combination, a first ante-combustion chamber positioned in advance of said main combustion chamber means; a second ante-combustion chamber positioned in advance of said main combustion chamber means; means for supplying fuel and an excess of oxidizer to each first ante-combustion chamber for combustion therein under excess oxidizer conditions; means for supplying oxidizer and an excess of fuel to each second ante-combustion chamber for combustion therein under excess fuel conditions; first delivery means for delivering the combustion gases from said first ante-combustion chamber to said main combustion chamber means; second delivery means, separate from said first delivery means, for delivering the combustion gases from said second ante-combustion chamber to said main combustion chamber means; said first and second ante-combustion chambers being arranged coaxially of each other with one of said ante-combustion chambers circumferentially embracing the other ante-combustion chamber; said turbine means comprising a turbine commonly associated with both said first and second ante-combustion chambers and including a stator forming one end wall of both said first and second ante-combustion chambers and a rotor coaxial with said ante-combustion chambers; and an annular partition extending from said common turbine and separating said first and second ante-combustion chambers from each other and further separating said first and second delivery means from each other; said partition being fixed to said rotor for rotation therewith.

21. In a liquid fuel rocket engine including ante-combustion chamber means, main combustion chamber means, means for supplying fuel and oxidizer to the ante-combustion chamber means for combustion therein, means for delivering the combustion gases from the ante-combustion chamber means to the main combustion chamber means, turbine means interposed in the path of the combustion gases for driving thereby, and feed pump means driven by the turbine means: the improvement comprising, in combination, a first ante-combustion chamber positioned in advance of said main combustion chamber means; a second ante-combustion chamber positioned in advance of said main combustion chamber means; means for supplying fuel and an excess of oxidizer to each first ante-combustion chamber for combustion therein under excess oxidizer conditions; means for supplying oxidizer and an excess of fuel to each second ante-combustion chamber for combustion therein under excess fuel conditions; first delivery means for delivering the combustion gases from said first ante-combustion chamber to said main combustion chamber means; second delivery means, separate from said first delivery means, for delivering the combustion gases from said second ante-combustion chamber to said main combustion chamber means; said first and second ante-combustion chambers being arranged coaxially of each other with one of said ante-combustion chambers circumferentially embracing the other ante-combustion chamber; said turbine means comprising a turbine commonly associated with both said first and second ante-combustion chambers and including a stator forming one end wall of both said first and second ante-combustion chambers and a rotor coaxial with said ante-combustion chambers; and an annular partition extending from said common turbine and separating said first and second ante-combustion chambers from each other and further separating said first and second delivery means from each other, said partition including a first partition portion fixed relative to said stator and a second partition portion, aligned with said first partition portion, and fixed relative to said rotor for rotation therewith.

22. In a liquid fuel rocket engine including ante-combustion chamber means, main combustion chamber means, means for supplying fuel and oxidizer to the ante-combustion chamber means for combustion therein, means for delivering the combustion gases from the ante-combustion chamber means to the main combustion chamber means, turbine means interposed in the path of the combustion gases for driving thereby, and feed pump means driven by the turbine means: the method of operating said engine comprising the steps of supplying fuel and an excess of oxidizer to a first ante-combustion chamber forming part of said ante-combustion chamber means for combustion therein under excess oxidizer conditions; supplying oxidizer and an excess of fuel to a second ante-combustion chamber forming part of said ante-combustion chamber means for combustion therein under excess fuel conditions; and separately delivering the combustion gases from the first and second ante-combustion chambers to the main combustion chamber means.

23. In a liquid fuel rocket engine including ante-combustion chamber means, main combustion chamber means, means for supplying fuel and oxidizer to the ante-combustion chamber means for combustion therein, means for delivering the combustion gases from the ante-combustion chamber means to the main combustion chamber means, turbine means interposed in the path of the combustion gases for driving thereby, and feed pump means driven by the turbine means: the method of operating said engine comprising the steps of supplying fuel and an excess of oxidizer to a first ante-combustion chamber forming part of said ante-combustion chamber means for combustion therein under excess oxidizer conditions; supplying oxidizer and an excess of fuel to a second ante-combustion chamber forming part of said ante-combustion chamber means for combustion therein under excess fuel conditions; separately delivering the combustion gases from the first and second ante-combustion chambers to the said main combustion chamber means; and supplying a combustible mixture to said main combustion chamber means only from said first and second ante-combustion chambers.

* * * * *